(12) United States Patent
Uno (10) Patent No.: US 7,990,563 B2
(45) Date of Patent: Aug. 2, 2011

(54) PRINTING UNIT AND INKJET RECORDING APPARATUS

(75) Inventor: Tetsuo Uno, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 493 days.

(21) Appl. No.: 12/210,388

(22) Filed: Sep. 15, 2008

(65) Prior Publication Data

US 2009/0073209 A1    Mar. 19, 2009

(30) Foreign Application Priority Data

Sep. 18, 2007  (JP) .................................. 2007-241211

(51) Int. Cl.
*G06K 15/22* (2006.01)

(52) U.S. Cl. .......... 358/1.17; 358/1.3; 358/1.4; 358/1.5; 347/9; 347/12; 347/14; 347/16; 347/104

(58) Field of Classification Search ................. 347/9, 12, 347/14, 16, 104; 358/1.15, 1.16, 1.17
See application file for complete search history.

(56) References Cited

U.S. PATENT DOCUMENTS

| 6,299,270 B1 * | 10/2001 | Merrill | 347/9 |
| 7,244,021 B2 * | 7/2007 | Arai | 347/102 |
| 7,445,303 B2 * | 11/2008 | Arakawa et al. | 347/9 |

FOREIGN PATENT DOCUMENTS

JP            07-47670 A    2/1995

* cited by examiner

*Primary Examiner* — Amr Awad
*Assistant Examiner* — Moustapha Diaby
(74) *Attorney, Agent, or Firm* — Holtz, Holtz, Goodman & Chick, PC (57) ABSTRACT

A print unit memorizes image data to be output to a page of recording media at a register as jetting data in an order of storing a plurality of image data of one line in page memory, wherein each of the image data of one line is memorized at the register in an order of storing the plurality of image data of one dot, in case when a conveyance direction of recording media is normal; and memorizes the image data to be output to the page of the recording media at the register in the order of storing the plurality of the image data of one line, wherein each of the image data of one line is memorized in a reverse order to the order of storing the plurality of the image data of one dot, in case when the conveyance direction is reverse.

7 Claims, 8 Drawing Sheets

PRINTING UNIT AND INKJET RECORDING APPARATUS

RELATED APPLICATION

This application is based on Japanese Patent Application No. 2007-241211 filed on Sep. 18, 2007 in Japan Patent Office, the entire content of which is hereby incorporated by reference.

TECHNICAL FIELD

The present invention relates to a printing unit and inkjet recording apparatus.

BACKGROUND

In the conventional inkjet recording apparatus for recording an image on a recording medium such as paper and cloth, recording media are conveyed sequentially by a conveyance apparatus, and ink is jetted from the recording head of the printing unit toward the recording medium, whereby an image is recorded on the surface of each recording medium (Japanese Unexamined Patent Application Publication No. 7-47670).

Figure 7:
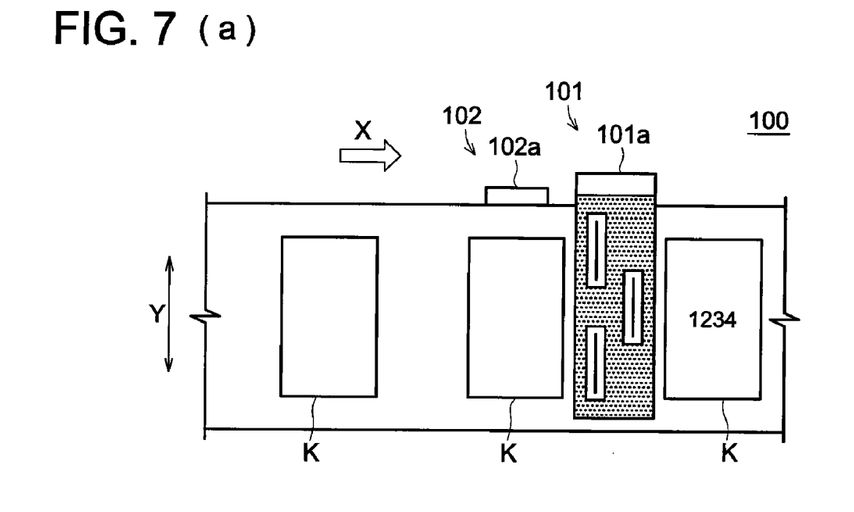
FIG. 7(a) and 7(b) are diagrams showing a conventional inkjet recording apparatus.

As shown in FIGS. 7(a) and (b), in such an inkjet recording apparatus 100, the direction of installing the printing unit 101 with respect to the direction X of conveying the recording medium K is determined in advance. Further, the conveyance apparatus 102 is so designed that the recording medium K can be conveyed only in one direction. Thus, when the inkjet recording apparatus 100 is designed, the printing unit 101 must be installed in conformity to the direction X in which the recording medium K is conveyed by a conveyance apparatus 102.

However, when the printing unit 101 and conveyance apparatus 102 are manufactured and sold as separate units, the direction of the operation panel 101a on the side of the printing unit 101 is aligned to that of the operation panel 102a on the side of the conveyance apparatus 102 in order to enhance the operation and maintenance efficiency. In this case, the direction of installing the printing unit 101 will be opposite to the direction of conveyance X, with the result that an image may not be recorded.

One object of the present invention is to provide a printing unit and inkjet recording apparatus capable of recording an image, independently of the direction of conveyance.

SUMMARY

One aspect of the present invention is a print unit comprising:

a recording head which jets ink onto recording media which is sequentially conveyed in one of a normal conveyance direction and a reverse conveyance direction, wherein the recording head comprises a nozzle array in which a plurality of nozzles are disposed intersecting to the conveyance direction and a register which latches jetting data corresponding to each nozzle on each jetting timing of the nozzle array and outputs each jetting data to each nozzle;

a page memory which memorizes image data to be output to a page of the recording medium in a data order corresponding to the normal conveyance direction, wherein the page memory divides the image data to be output to the page of the recording medium into a plurality of image data of one line to be printed on each jetting timing and stores the plurality of image data of one line in an order of the jetting timing, wherein each of the image data of one line is divided into a plurality of image data of one dot to be printed at each nozzle and is stored in an order of a disposition of the nozzles;

a conveyance direction detection section for detecting if the conveyance direction is the normal conveyance direction or the reverse conveyance direction; and a control section which controls the recording head to jet ink based on the image data to be output to the page at the page memory, wherein the control section comprises a reading out section which memorizes the image data to be output to the page at the register as the jetting data in a order of storing the plurality of the image data of one line in the page memory, wherein each of the image data of one line is memorized at the register in a order of storing the plurality of image data of one dot in the page memory, in case when the detection section detects the conveyance direction as the normal conveyance direction;

and memorizes the image data to be output to the page at the register as the jetting data in the order of storing the plurality of the image data of one line in the page memory, wherein each of the image data of one line is memorized in a reverse order to the order of storing the plurality of the image data of one dot in the page memory, in case when the detection section detects the conveyance direction as the reverse conveyance direction.

DESCRIPTION OF THE PREFERRED EMBODIMENT

The following describes the inkjet recording apparatus of the present invention:

[1] Schematic Structure of Inkjet Recording Apparatus

Figure 1:
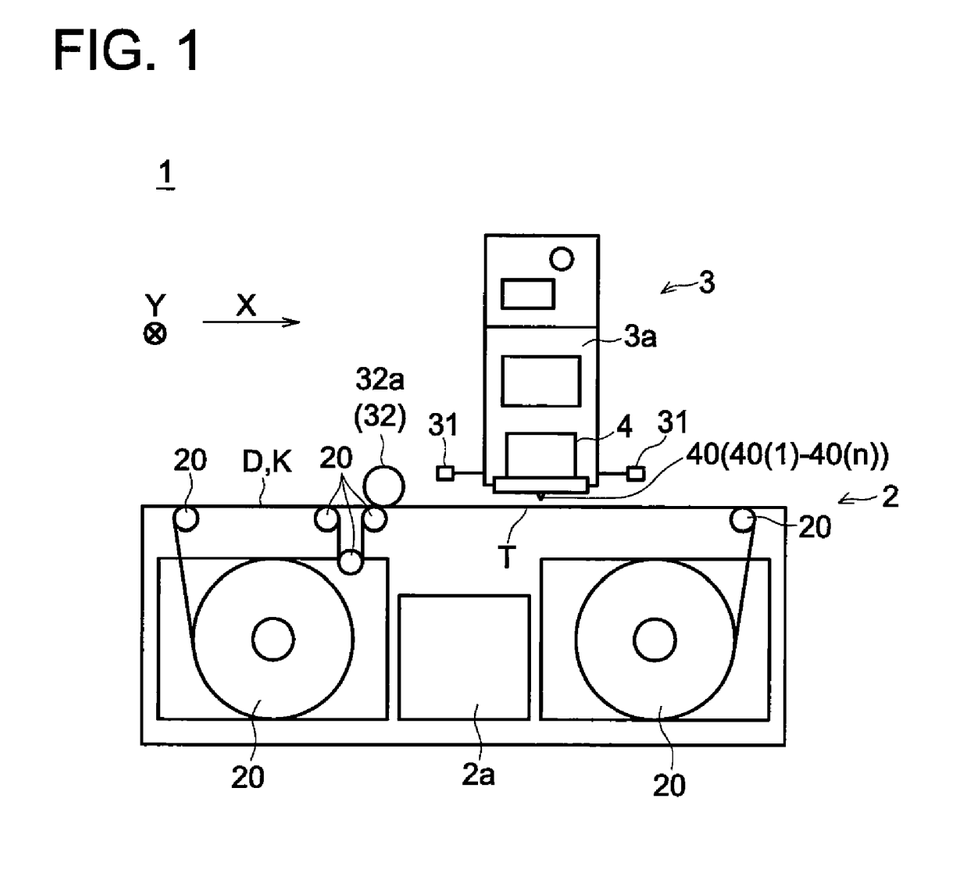
FIG. 1 is a side view representing the schematic structure of an inkjet recording apparatus of the present invention.

FIG. 1 is a side view representing the schematic structure of an inkjet recording apparatus of the present embodiment. In the present embodiment, the inkjet recording apparatus 1 will be described as a one-pass type inkjet recording apparatus wherein an image is recorded during one operation of conveying the recording medium K.

In this inkjet recording apparatus 1, an image is recorded on a recording medium K based on the image data and others sent from a personal computer (not illustrated). As shown in FIG. 1, the inkjet recording apparatus 1 is provided with a conveyance apparatus 2 and a printing unit 3 arranged opposite to each other.

The conveyance apparatus 2 conveys a plurality of recording media K sequentially in one direction (hereinafter referred to as "direction of conveyance X") through the rotation of the conveyance rollers 20. An operation panel 2a is provided on one side.

Figure 2:
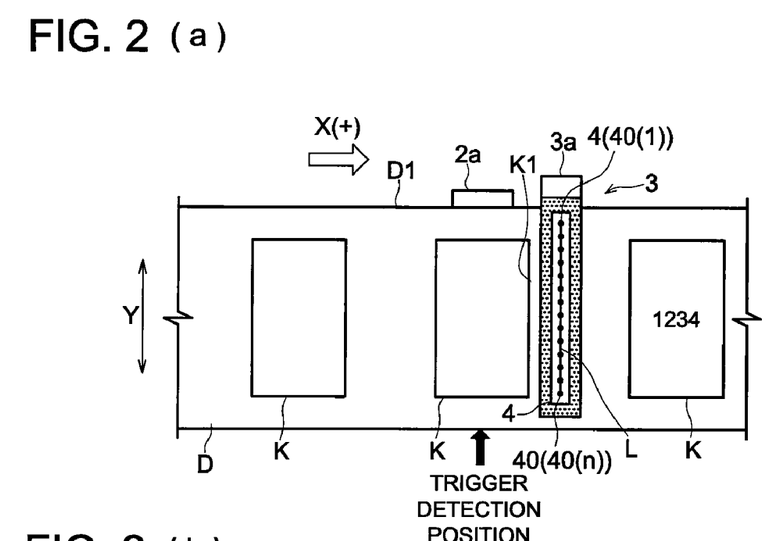
FIGS. 2(a) and 2(b) are diagrams explaining the operation of the inkjet recording apparatus of the present invention.

As shown in FIG. 2, the recording medium K of the present embodiment is pasted on the surface of longer ground paper D at a space interval of predetermined page, and is conveyed in conformity to the movement of the ground paper D.

The printing unit 3 records images on the recording media K conveyed sequentially by the conveyance apparatus 2. As shown in the aforementioned FIG. 1, the operation panel 3a is provided on one side. When viewed from the operation panel 3a, the printing unit 3 of the present embodiment permits images to be recorded on the recording media K conveyed from left to right (FIG. 2(a), hereinafter referred to as "normal conveyance direction X (+)"), as well as on the recording media K conveyed from right to left (FIG. 2(b), hereinafter referred to as "reverse conveyance direction X (−)").

The printing unit 3 has a recording head 4 that jets ink toward the recording medium K. In the present embodiment, the printing unit 3 is assumed to have only one recording head 4, and this recording head 4 is assumed to jet ink of one color.

The recording head 4 is provided with a line of nozzles L which extend in the width-wise direction Y of the ground paper D, namely, in the direction perpendicular to the direction of conveyance X.

As shown in FIG. 1 and FIGS. 2(a) and 2(b), the line of nozzles L is made up of "n" nozzles 40 (wherein "n" is a natural number of 2 or more), and is formed from one end to the other of the recording medium K in the width-wise direction Y. Of the nozzles 40 in the line of nozzles L, the N-th one from the operation panel 3a (wherein "N" indicates a natural number ranging from 1 through "n") is assumed as nozzle 40 (N), and the numeral in parenthesis is considered the number of the relevant nozzle 40 in the following description.

These nozzles 40 are designed to jet ink drops according to the jetting enable/disable data and drive waveform generated for each nozzle 40 based on the image data. To put it in greater details, the recording head 4 is provided with a piezoelectric element (not illustrated) for emitting ink from the nozzle 40, and this piezoelectric element oscillates based on the drive waveform and jetting enable/disable data, whereby the ink in the nozzle 40 is oscillated and emitted.

[2] Functional Structure of Printing Unit 3

Figure 3:
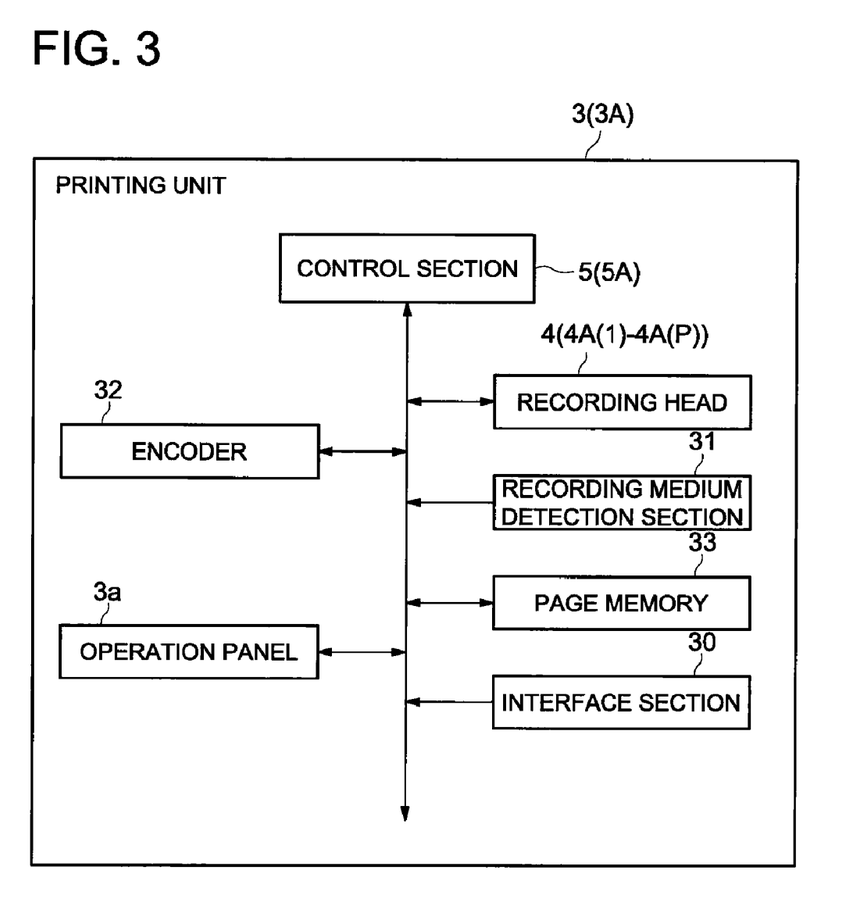
FIG. 3 is a block diagram showing the schematic structure of the printing unit of the present invention.

The following describes the functional structure of printing unit 3:

FIG. 3 is a block diagram showing the schematic structure of the printing unit 3. As shown in FIG. 3, the printing unit 3 includes the aforementioned recording head 4 as well as an interface section 30, recording medium detection section 31, encoder 32, page memory 33 and control section (control means) 5.

[2-1] Recording Head 4

Figure 4:
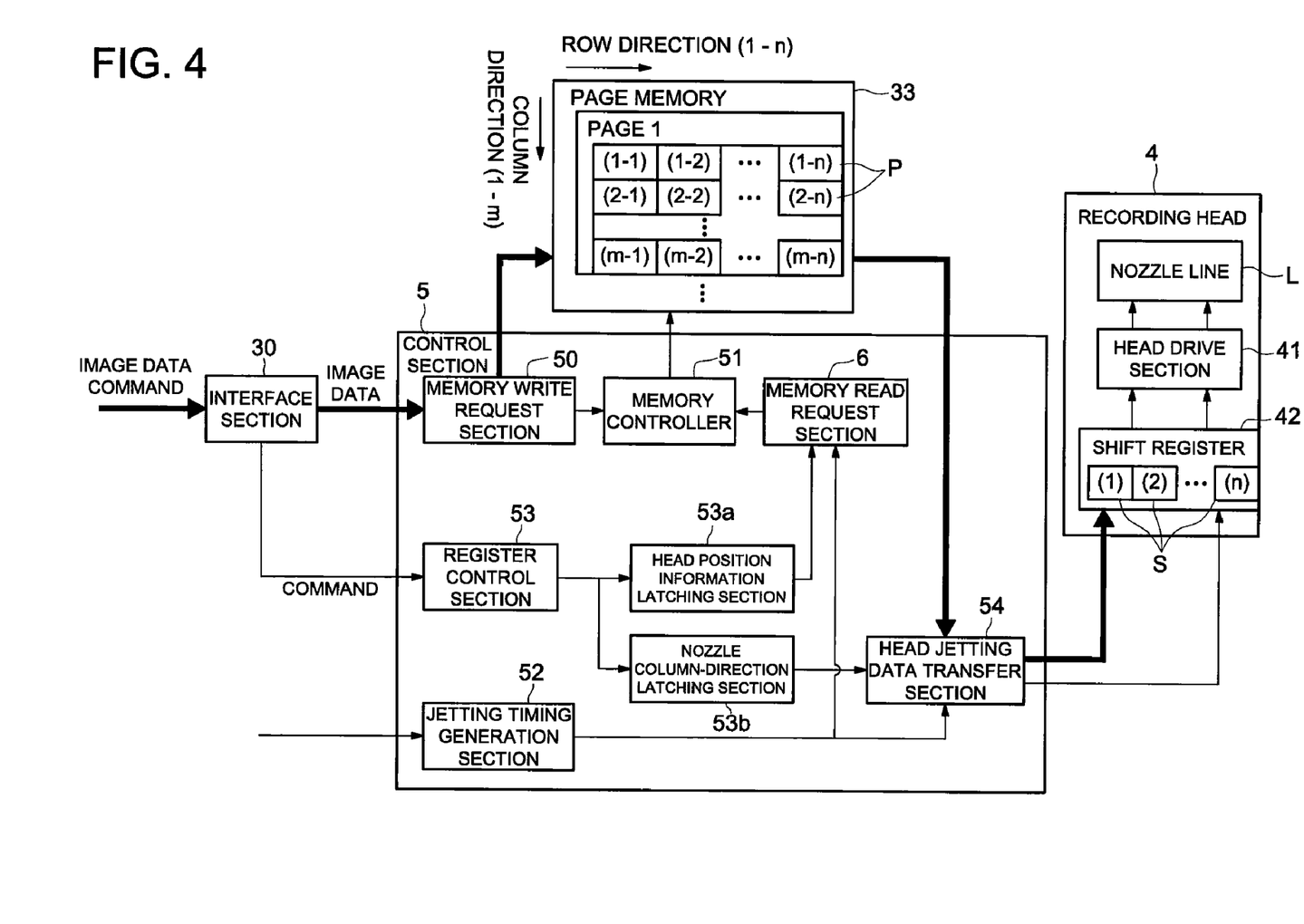
FIG. 4 is a diagram explaining the operation of the printing unit of the present invention.

As shown in FIG. 4, the recording head 4 includes a shift register 42 and a head drive section 41 located between this shift register 42 and the line of nozzles L.

The shift register 42 latches "n" pieces of jetting enable/disable data for the nozzles 40 (1) through 40 (n) in one operation of jetting by means of "n" storage elements S arranged in series. In the present embodiment, jetting enable/disable data is inputted in a serial form and is outputted in a parallel form. The following description assumes that the storage element S in the shift register 42 corresponding to the nozzle 40 (N) is the storage element S(N), and the numeral in parenthesis indicates the address of the relevant storage element S.

The head drive section 41 latches the jetting enable/disable data from the shift register 42 and controls the on/off operation of the drive pulse signal for the piezoelectric element of each nozzle 40 synchronously with each jetting operation, based on this jetting enable/disable data.

[2-2] Interface Section 30

As shown in FIG. 3, the interface section 30 receives the image data and command signal sent from a personal computer (not illustrated).

In the present embodiment, the command signal from the personal computer includes information on the direction of conveyance X (normal or reverse), the number of recording heads 4, position of the recording head 4, the order of the nozzles 40 arranged, and image resolution.

Of these pieces of information, the information on the position of the recording head 4 contains the information on the position of the recording head 4 in the width-wise direction Y, and the information on the position of the recording head 4 in the direction of conveyance X. To put it in greater details, the information on the position of the recording head 4 in the width-wise direction Y can be defined as the information on the position of the recording head 4 in the width-wise direction Y wherein a predetermined position of the ground paper D is used as a reference. In the present embodiment, the left edge of the ground paper D (hereinafter referred to as "reference edge D1") with reference to the direction of conveyance X (FIG. 2) is used as reference. The information on the position of the recording head 4 in the direction of conveyance X can be defined as the information on the position of the recording head 4 in direction of conveyance X when the recording medium detection section 31 is used as reference. It is also possible to arrange such a configuration that such position information is stored in the printing unit 3 in advance without being included in the command signal from the personal computer.

Further, the order of the nozzles 40 arranged can be defined as the order of the nozzles 40 arranged from the side closer to the reference edge D1. To put it in greater details, when the direction of conveyance X is normal (FIG. 2 (a)), nozzles are arranged in the order of nozzles 40(1) through 40 (n). When the direction of conveyance X is normal (FIG. 2 (b)), they are arranged in the order of nozzles 40 (n) through 40 (1).

[2-3] Recording Medium Detection Section 31

The recording medium detection section 31 detects the edge (trigger) K1 on the front end of the recording medium K to be conveyed. It is arranged opposite to the ground paper D (recording medium K) (FIG. 1) on the upstream side in each of the normal and reverse conveyance direction X with respect to the recording head 4. Such a recording medium detection section 31 can be the one that detects the edge K1 of the recording medium K, based on the difference in reflectivity between the ground paper D and recording medium K, or the one that detects a predetermined mark preset on the edge K1 of the recording medium K.

[2-4] Encoder 32

The encoder 32 outputs the pulse signal every time the recording medium K is conveyed a predetermined amount. As shown in FIG. 1, the encoder 32 of the e present embodiment is provided on the roller 320a that rotates in conformity to the movement of the ground paper D (recording medium K) to be conveyed. It constitutes a rotary encoder that rotates in response to the amount of the ground paper D (recording medium K) conveyed.

[2-5] Page Memory 33

The page memory 33 stores the image data to be output to each page of the recording medium K. In the present embodiment, the image data to be output to each page is stored in the order of the data corresponding to the normal conveyance direction X (+).

To put it in more details, as shown in FIG. 4, the page memory 33 divides the image data for the recording medium K of each page into the image data of one line to be recorded at every jetting by means of (m×n) storage elements P (wherein "m" is a natural number) arranged in matrix, and stores the data in the order of jetting timing. At the same time, the page memory 33 also divides this image data of one line into the one-dot image data for each dot to be recorded by each nozzle 40, and stores the data in the order of nozzles 40 arranged. To be more specific, in the order of nozzles 40 (1) through nozzle 40 (n). When one and the same image is recorded onto the recording medium K of each page, the page memory 33 stores the image data for one page. The following description assumes that the direction of the one-column image data arranged in the page memory 33 is the direction of row, and the direction of the one-dot image data arranged is the direction of column. Further, of the storage elements P in the page memory 33, the M-th element in the direction of row (wherein M is a natural number ranging from 1 through n) and the N-th element in the direction of column are the storage element P (M-N), and a combination of the numerals in parenthesis is an address of the storage element P. Thus, the address of the storage element P wherein the one-dot image data to be recorded by the nozzle 40 (1) onto the recording medium K conveyed in the direction of conveyance X (+) at the first operation of jetting is (1-1).

[2-6] Control Section 5

The control section 5 controls the drive of each sections of the printing unit 3. In the present embodiment, the control section 5 is replaceably mounted on the printing unit 3. As shown in FIG. 4, the control section 5 includes a memory write request section 50, memory read request section 6, memory controller 51, register control section (conveyance direction detection means) 53, jetting timing generation section 52 and head jetting data transfer section 54. In the present embodiment, of various components of the control section 5, the components other than the register control section 53 are formed of the conventionally known hardware circuit.

[2-6-1] Memory Write Request Section 50

The memory write request section 50 sends and stores into the page memory 33 the image data sent from a personal computer through the interface section 30. The image data is sent to the page memory 33, and a write signal and an address designation signal of the storage elements P in the page memory 33 are sent to the memory controller 51.

[2-6-2] Memory Read Request Section 6

The memory read request section 6 sends the image data in the page memory 33 to the head jetting data transfer section 54. The read signal and the address designation signal of the storage elements P in the page memory 33 are sent to the memory controller 51. The details of this memory read request section 6 will be described in [3].

[2-6-3] Memory Controller 51

In response to the write signal and address designation signal of the memory write request section 50, the memory controller 51 ensures the image data to be stored in the storage elements P for writing in the page memory 33. In conformity to the read signal and address designation signal from the memory read request section 6, the memory controller 51 ensures the image data to be outputted from the storage elements P for reading in the page memory 33.

[2-6-4] Register Control Section 53

The register control section 53 is made of a CPU. In response to the command signal inputted from the personal computer through the interface section 30, the register control section 53 controls the data to be outputted to the shift register 42 of the recording head 4.

To put it more specifically, the register control section 53 is connected to the memory read request section 6 through the head position information latching section 53a. The information on the position of the recording head 4 in the direction of conveyance X and in the width-wise direction Y and the page number information of the recording medium K for recording the image at a predetermined timing are extracted from the command signal, and are once latched by the head position information latching section 53a. Then these pieces of information are sent to the memory read request section 6. This register control section 53 is connected to the head jetting data transfer section 54 through nozzle column-direction latching section 53b. The order of nozzles 40 (1) through 40 (n) arranged with respect to the reference edge D1 is extracted from the command signal, is once latched by the nozzle column-direction latching section 53b, and is then sent to the head jetting data transfer section 54.

[2-6-5] Jetting Timing Generation Section 52

The jetting timing generation section 52 generates the timing signal for emitting ink to the recording medium K. In the present embodiment, the pulse signal from the encoder 32 and the detection signal for recording medium K from the recording medium detection section 31 are sent to the memory read request section 6. At the same time, the drive waveform corresponding to the pulse signal from the encoder 32 is sent to the head jetting data transfer section 54.

[2-6-6] Head Jetting Data Transfer Section 54

The head jetting data transfer section 54 serially transmits to the shift register 42 the one-column image data sent from the page memory 33 as one-bit jetting enable/disable data for each nozzle 40. To put it in greater details, based on the information from the nozzle column-direction latching section 53b, the head jetting data transfer section 54 in this case transmits the jetting enable/disable data by keeping the normal order of one-dot image data in this one-column image data, if the nozzles 40 are arranged in the order of nozzles 40 (1) through 40 (n), and by reversing the order of one-dot image data, if the nozzles 40 are arranged in the order of nozzle 40 (n) through 40 (1).

Further, based on the information from the jetting timing generation section 52, this head jetting data transfer section 54 transmits to the shift register 42 the latch timing signal for jetting enable/disable data and the SCLK signal for synchronizing the output of jetting enable/disable data with each Jetting operation.

[3] Memory Read Request Section 6

The following describes the details of the aforementioned memory read request section 6.

Figure 5:
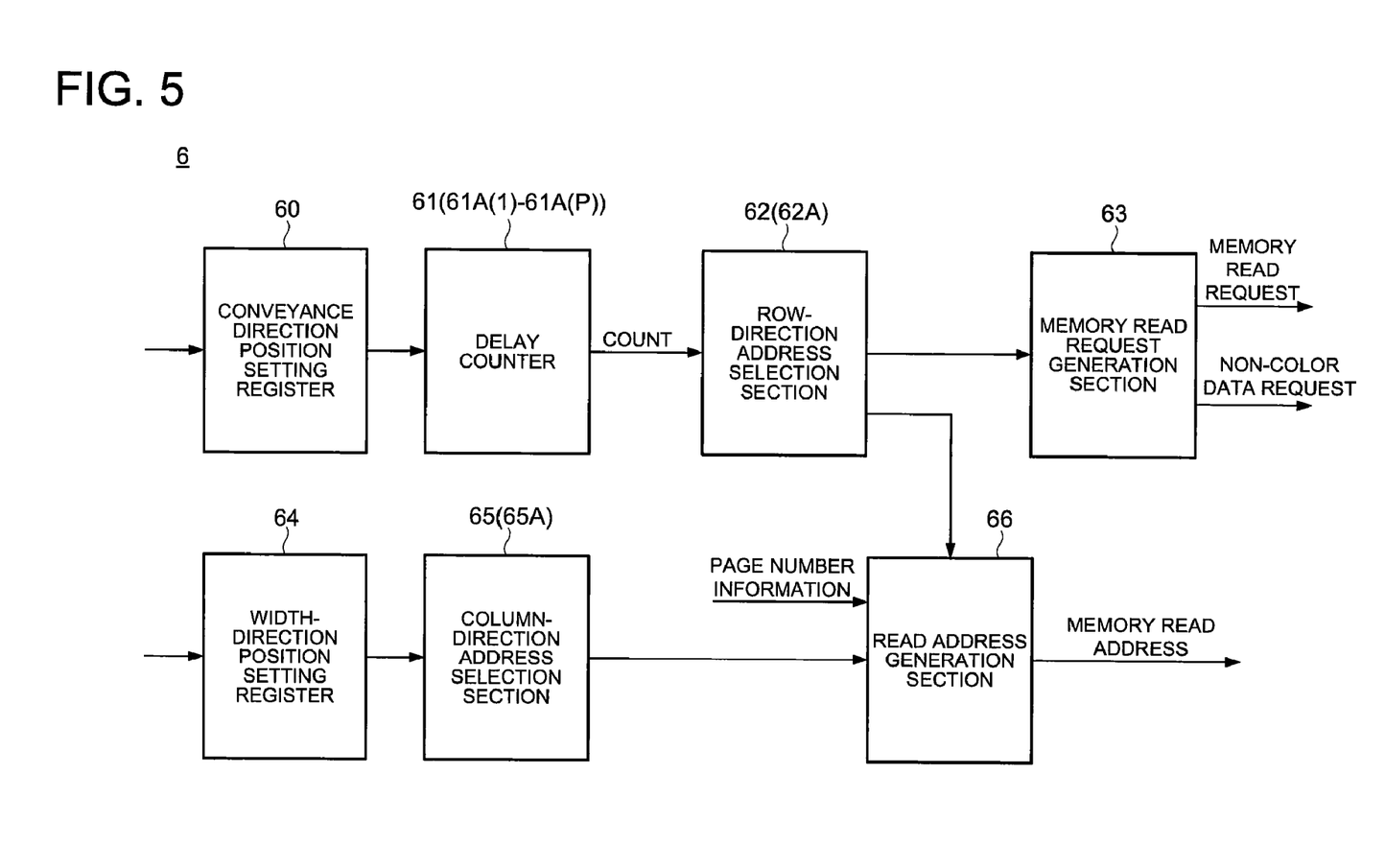
FIG. 5 is a diagram explaining the operation of a memory read request section.

As shown in FIG. 5, the memory read request section 6 includes a conveyance direction position setting register 60, delay counter 61, row-direction address selection section 62, memory read request generation section 63, width-direction position setting register 64, column-direction address selection section 65 and read address generation section 66.

[3-1] Conveyance Direction Position Setting Register 60

The conveyance direction position setting register 60 receives from the head position information latching section 53a the information on the position of the recording head 4 in the direction of conveyance X—the information on the position of the recording head 4 in the direction of conveyance X when the recording medium detection section 31 is assumed as a reference position, to put it in greater details. The conveyance direction position setting register 60 latches this information and sends it to the delay counter 61.

[3-2] Delay Counter 61

Based on the information from the conveyance direction position setting register 60 (information on the position of the reading head 4 in the direction of conveyance X) and the pulse signal from the encoder 32, the delay counter 61 counts the distance between the edge K1 of the recording medium K detected by the recording medium detection section 31 and the ink hitting position T on the recording head 4 (FIG. 1), and outputs the count. Further, after the edge K1 of the recording medium K has passed by the ink hitting position T, this delay counter 61 counts up the distance between this edge K1 and ink hitting position T, and outputs the resulting count. This procedure makes it possible to select the address of the one-column image data to be recorded by the recording head 4 at a predetermined time interval in the direction of row (the direction of conveyance Y) in the page memory 33.

It is also possible to arrange such a configuration that the aforementioned delay counter 61 counts up and down the distance between the edge on the front end in the direction of conveyance X in the recording area of the recording medium K and ink hitting position T.

[3-3] Row-Direction Address Selection Section 62

From the row-direction addresses "1" through "m" for one page in the page memory 33, the addresses of the one-column image data to be recorded by the recording head 4 at a predetermined time interval are selected sequentially starting from the head address by the row-direction address selection section 62, based on the count of the delay counter 61. The selected addresses are sent to the read address generation section 66 and memory read request generation section 63.

If the recording medium K is not present at the position opposite to the recording head 4 at a predetermined time interval, namely, if the address of the storage element P for storing the one-column image data to be recorded by the recording head 4 at a predetermined time interval is not present in the page memory 33, this row-direction address selection section 62 sends an address absence signal to the read address generation section 66 and memory read request generation section 63.

[3-4] Memory Read Request Generation Section 63

When the address signal has been transmitted from the row-direction address selection section 62, the memory read request generation section 63 sends a read request signal to the memory controller 51 so that the image data of the address from the read address generation section 66 will be read. When the signal reporting the absence of an address has been transmitted from the row-direction address selection section 62, the memory read request generation section 63 transmits the read request signal to the memory controller 51 so that the colorless image data will be read out.

[3-5] Width-Direction Position Setting Register 64

The width-direction position setting register 64 receives and latches the information on the position of the recording head 4 in the width-wise direction Y from the head position information latching section 53*a*, and sends it to the column-direction address selection section 65.

[3-6] Column-Direction Address Selection Section 65

From the column-direction addresses "1" through "n" in the page memory 33, the addresses of the one-dot image data to be recorded by the recording head 4 are selected by the column-direction address selection section 65 based on the information sent from the width-direction position setting register 64, and are sent to the read address generation section 66. In the present embodiment, only one line of nozzles L of the recording head 4 is provided from one end to the other end of the recording medium K. Accordingly, the column-direction address selection section 65 selects all the addresses in the direction of column in the page memory 33.

[3-7] Read Address Generation Section 66

In conformity to the address selected by the row-direction address selection section 62, the address selected by the column-direction address selection section 65, and the page number information sent from the register control section 53, the read address generation section 66 sends to the memory controller 51 the address of the image data to be read from the page memory 33. When a signal without address information has been sent from the row-direction address selection section 62, the read address generation section 66 sends this signal directly to the memory controller 51.

[4] Operation of Inkjet Recording Apparatus 1

The following describes the operation of the aforementioned inkjet recording apparatus 1 with reference to FIG. 2:

[4-1] When the Conveyance Apparatus 2 Sends the Recording Medium K to the Normal Conveyance Direction X (+):

In the first place, referring to FIG. 2 (*a*), the following describes the operation when the recording medium K is conveyed in the normal conveyance direction X (+):

In this case, the image data and command signal are sent to the inkjet recording apparatus 1 from a personal computer. The image data is stored in the page memory 33 by the memory write request section 50 and memory controller 51. This procedure ensures that the one-dot image data to be recorded by the nozzles 40 (1) through 40 (*n*) in response to the M-th jetting operation is stored in the storage elements P (M-1) through P (M-n).

When the conveyance apparatus 2 of the inkjet recording apparatus 1 starts the conveyance of ground paper D and recording medium K, the encoder 32 rotates in conformity to the movement of the ground paper D (recording medium K), and the amount of rotation is outputted in the form of a pulse signal. Further, the recording medium detection section 31 detects the edge K1 on the front end side of the recording medium K in the direction of conveyance X.

Further, in the register control section 53, the information on the position of the recording head 4 in the direction of conveyance X and in the width-wise direction Y and the page number information "1" of the recording medium K for recording the image at a predetermined time interval are extracted from the command signal, and are latched by the head position information latching section 53*a*. After that, these pieces of information are sent to the memory read request section 6. Further, the information on the order of arrangement of the nozzles 40 with respect to the reference edge D1 (the order of nozzles 40 (1) through 40 (*n*) in the example of this operation) is extracted from the command signal by this register control section 53, and is latched in the nozzle column-direction latching section 53*b*. After that, this information is sent to the head jetting data transfer section 54.

Based on the information sent from the width-direction position setting register 64 (information on the position of the recording head 4 in the width-wise direction Y), the column-direction address selection section 65 then designates all the addresses "1" through "n" in the direction of column in the page memory 33.

Further, when the recording medium detection section 31 is used as a reference position, the information on the position of the recording head 4 in the direction of conveyance X is sent to the delay counter 61 through the conveyance direction position setting register 60. Based on the pulse signal from the encoder 32, the delay counter 61 starts counting up and down of the distance between the edge K1 of the recording medium K and the ink hitting position T on the recording head 4.

From the row-direction addresses for one page in the page memory 33, the address "1" in the first column from the leading position is selected by the row-direction address selection section 62 based on the count sent from the delay counter 61, and is sent to the read address generation section 66 and memory read request generation section 63.

Based on the address "1" selected by the row-direction address selection section 62, addresses "1" through "n" selected by the column-direction address selection section 65, and page number information "1" sent from the register control section 53, the addresses (1-1) through (1-n) of the image data to be read from the page memory 33 are sent to the memory controller 51 by the read address generation section 66. The memory read request generation section 63 sends the read request signal to the memory controller 51 so that the image data of the address sent from the read address generation section 66 will be read out. Then the image data is read out from the storage elements P (1-1) through P (1-n) of the page memory 33 and is sent to the head jetting data transfer section 54.

Based on the information from the nozzle column-direction latching section 53b (information that the nozzles 40 are arranged in the order of nozzles 40 (1) through 40 (n), in this example of operation), the head jetting data transfer section 54 serially sends the one-column image data sent from the page memory 33 as one-bit jetting enable/disable data for each of the nozzles 40 to the shift register 42 directly in the normal order. In this case, according to the information from the jetting timing generation section 52, the head jetting data transfer section 54 sends to the shift register 42 the latch timing signal for the jetting enable/disable data (drive waveform signal) and the SCLK signal for synchronizing the output of each jetting enable/disable data with each jetting operation.

Thus, the jetting enable/disable data corresponding to the image data in the storage elements P (1-1) through P (1-n) of the page memory 33 is stored in the storage elements S(1) through S(n) of the shift register 42.

When the record area of the recording medium K corresponding to the first jetting has reached the ink hitting position T, the recording head 4 emits ink in response to the jetting enable/disable data and drive waveform.

After that, the aforementioned operation is repeated, whereby the image data for the recording medium K of the relevant page is read out of the page memory 33 in the order of the one-column image data stored, and in the order of the one-dot image data stored, and is stored as the jetting enable/disable data in the shift register 42 in the order of being read out. Based on this jetting enable/disable data, each image is recorded on the recording medium K (recording medium K on the right of the diagram).

[4-2] When the Conveyance Apparatus 2 Conveys the Recording Medium K in the Reverse Conveyance Direction X (−):

Referring to FIG. 2(b), the following describes the operation when the recording medium K is conveyed in the reverse conveyance direction X (−):

In this case, when the image data and command signal have been sent from the personal computer to the inkjet recording apparatus 1, image data is stored in the page memory 33, similarly to the case of the aforementioned [4-1].

When the conveyance apparatus 2 of the inkjet recording apparatus 1 has started conveyance of the ground paper D and recording medium K, the encoder 32 rotates in conformity to the movement of the ground paper D (recording medium K), and the amount of rotation is outputted in the form of a pulse signal. Further, the recording medium detection section 31 detects the edge K1 on the front end side of the recording medium K in the direction of conveyance X.

In the register control section 53, the information on the position of the recording head 4 in the direction of conveyance X and in the width-wise direction Y, and the page number information "1" of the recording medium K for recording the image at a predetermined time interval are extracted from the command signal, and are latched by the head position information latching section 53a. After that, these pieces of information are sent to the memory read request section 6. Further, the information on the order of arrangement of the nozzles 40 with respect to the reference edge D1 (the order of nozzles 40 (n) through 40 (1) in the example of this operation) is extracted from the command signal by this register control section 53, and is latched in the nozzle column-direction latching section 53b. After that, this information is sent to the head jetting data transfer section 54.

Based on the information sent from the width-direction position setting register 64 (information on the position of the recording head 4 in the width-wise direction Y), the column-direction address selection section 65 then designates all the addresses "1" through "n" in the direction of column in the page memory 33.

Further, when the recording medium detection section 31 is used as a reference position, the information on the position of the recording head 4 in the direction of conveyance X is sent to the delay counter 61 through the conveyance direction position setting register 60. Based on the pulse signal from the encoder 32, the delay counter 61 starts counting up and down of the distance between the edge K1 of the recording medium K and the ink hitting position T on the recording head 4.

From the row-direction addresses for one page in the page memory 33, the address "1" in the first column from the leading position is selected by the row-direction address selection section 62 based on the count sent from the delay counter 61, and is sent to the read address generation section 66 and memory read request generation section 63.

Based on the address "1" selected by the row-direction address selection section 62, addresses "1" through "n" selected by the column-direction address selection section 65, and page number information "1" sent from the register control section 53, the addresses (1-1) through (1-n) of the image data to be read from the page memory 33 are sent to the memory controller 51 by the read address generation section 66. The memory read request generation section 63 sends the read request signal to the memory controller 51 so that the image data of the address sent from the read address generation section 66 will be read out. Then the image data is read out from the storage elements P (1-1) through P (1-n) of the page memory 33 and is sent to the head jetting data transfer section 54.

Based on the information from the nozzle column-direction latching section 53b (information that the nozzles 40 are arranged in the order of nozzles 40 (n) through 40 (1), in this example of operation), the head jetting data transfer section 54 serially sends the one-column image data sent from the page memory 33 as one-bit jetting enable/disable data for each of the nozzles 40 to the shift register 42 in the reverse order. In this case, according to the information from the jetting timing generation section 52, the head jetting data transfer section 54 sends to the shift register 42 the latch timing signal for the jetting enable/disable data (drive waveform signal) and the SCLK signal for synchronizing the output of each jetting enable/disable data with each jetting operation.

Thus, the jetting enable/disable data corresponding to the image data in the storage elements P (1-n) through P (1-1) of the page memory 33 is stored in the storage elements S(1) through S(n) of the shift register 42.

When the record area of the recording medium K corresponding to the first jetting has reached the ink hitting position T, the recording head 4 emits ink in response to the jetting enable/disable data and drive waveform.

After that, the aforementioned operation is repeated, whereby the image data for the recording medium K of the relevant page is read out of the page memory 33 in the order of the one-column image data stored, and in the order of the one-dot image data stored, and is stored as the jetting enable/disable data in the shift register 42 in the order of reading the one-column image data and in the order reverse to that of reading the one-dot image data. Based on this jetting enable/disable data, each image is recorded on the recording medium K being conveyed in the reverse conveyance direction (recording medium K on the left end of the diagram). To put it another way, the image is recorded based on the image data turned 180 degrees, as a result. Accordingly, the recorded image is the same as that of the aforementioned [4-1].

According to the inkjet recording apparatus 1, when the direction of conveyance X is reverse, the image data is recorded on each recording medium K based on the image data turned 180 degrees. This arrangement ensures an image to be recorded, independently of the direction of conveyance X.

An image can be recorded independently of the direction of conveyance X. This arrangement ensures the operation and maintenance efficiency to be enhanced by aligning the direction of the operation panel 3*a* of the printing unit 3 with respect to the operation panel 2*a* of the conveyance apparatus 2.

The present invention is not restricted to the aforementioned embodiments. The present invention can be embodied in a great number of variations with appropriate modification or additions, without departing from the technological spirit and scope of the invention claimed.

For example, in the aforementioned embodiment, when the direction of conveyance X is normal, the head jetting data transfer section 54 sends the one-column image data to the shift register 42 directly in the normal order. When the direction of conveyance X is reverse, the image data is sent to the shift register 42 in the reverse order. However, it is also possible to arrange such a configuration that the shift register 42 is set so as to permit serial inputting from both ends. Thus, when the direction of conveyance X is normal, the one-column image data is inputted serially in the normal order from one end. When the direction of conveyance X is reverse, the one-column image data is inputted serially in the normal order from the other end. In this case, when the direction of conveyance X is reverse, the one-column image data is stored in the shift register 42 in the reverse order. This arrangement provides the same advantage as that in the aforementioned embodiment.

Further, in the aforementioned embodiment, when the direction of conveyance X is reverse, the control section 5 reads out the image data in the order of the one-column image data being stored and in the order of the one-dot image data being stored, and stores the image data as jetting enable/disable data in the shift register 42 in the order of one-column image data being read out and in the order reverse to that of the one-dot image data being read out. However, it is also possible to arrange such a configuration that other operations can be performed, insofar as the image data to be output to each page in the page memory 33 is stored as jetting enable/disable data in the shift register in the order of one-column image data being stored and in the order reverse to that of the one-dot image data being stored. To put it more specifically, for example, means can also be provided to ensure that, when the direction of conveyance X is reverse, the control section 5 reads image data from the page memory 33 in the order of the one-column image data being stored, and in the order reverse to that of the one-dot image data being stored, and stores the image data as the jetting enable/disable data in the shift register 42 in the order of being read.

Further, in the aforementioned embodiment, the register control section 53 determines the normal/reverse property of the direction of conveyance X based on the command signal from the personal computer. It is also possible that the register control section 53 determines the normal/reverse property of the direction of conveyance X based on the operation of the operation panels 3*a* and 2*a* performed by the user.

In the aforementioned embodiment, the extended direction of the recording head 4 is considered as the width-wise direction Y, but another direction can be considered as such, if it crosses the direction of conveyance X.

<Example of Variation>

The following describes an example of the variation of the inkjet recording apparatus of the present invention. The same components as those of the aforementioned first embodiment will be assigned with the same reference numbers, and the description thereof will be omitted.

[5] Approximate Structure of the Variation of the Inkjet Recording Apparatus

Figure 6:
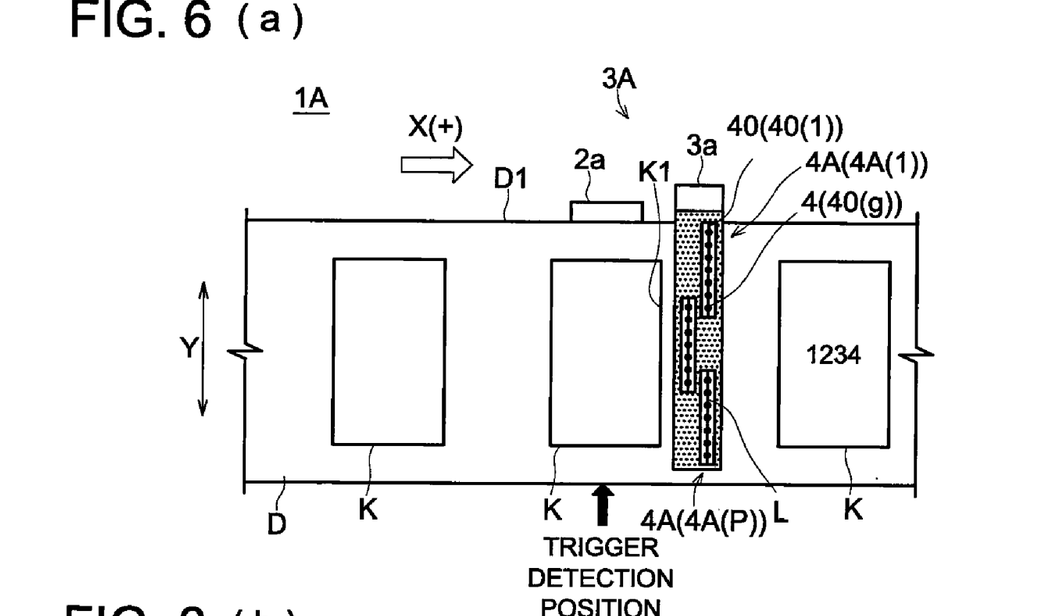
FIG. 6(a) and 6(b) are diagrams explaining the operation of a variation of the inkjet recording apparatus of the present invention.

FIG. 6 is a plan view showing the approximate structure of the inkjet printer 1A in the present variation.

As shown in FIG. 6, the printing unit 3A of the inkjet recording apparatus 1A has "p" recording heads 4A (wherein "p" is a natural number of two or more). These recording heads 4A are laid out in a two-column staggered arrangement extending in the width-wise direction Y. Further, each recording head 4A is provided with a line of nozzles L made up of "q" nozzles 40 (1) through 40 (*q*) (wherein "q" is two or more, and less than "n") arranged in the width-wise direction Y. Of these "p" recording heads 4A, the one located on the left side with respect to the direction of conveyance X, namely, the P-th head (wherein P is a natural number from 1 through p) counted from the reference edge D1 of the ground paper D is assumed as a recording head 4A (P), and the numeral in parenthesis indicates the number of the recording head 4A.

Figure 8:
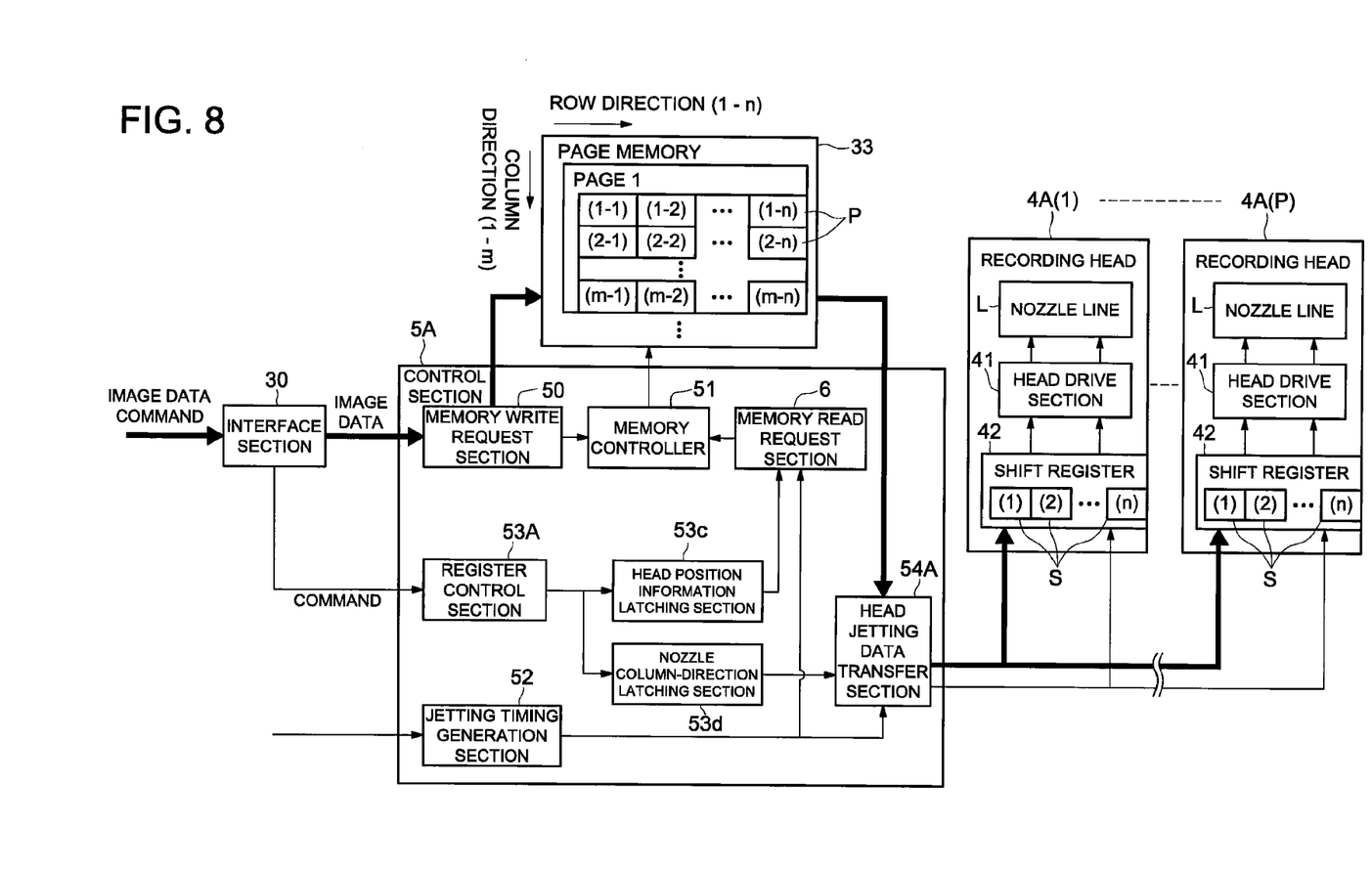
FIG. 8 is a diagram explaining the operation of a variation of the printing unit of the present invention.

Further, as shown in the aforementioned FIG. 3 and FIG. 8, the control section 5A of the printing unit 3A has a register control section 53, "p" head position information latching sections 53*c* corresponding to each recording heads 4A, and nozzle column-direction latching sections 53*d*. In the following description, of these "p" head position information latching sections 53*c* and nozzle column-direction latching sections 53*d*, those corresponding to the recording head 4A (P) will be considered as the head position information latching section 53*c* (P) and nozzle column-direction latching section 53*d* (P). The numerals in parentheses indicate the numbers of the head position information latching section 53*c* and nozzle column-direction latching section 53*d*.

Of the aforementioned components, the register control section 53A is connected to the memory read request section 6 through each head position information latching section 53*c*. The position information in the direction of conveyance X and in the width-wise direction Y of the recording head 4A corresponding to each head position information latching section 53*c*, and the number information of the recording head 4A, and page number information of the recording medium K for recording the image at a predetermined time interval are extracted from the command signal. They are once latched by the head position information latching section 53*c*, and are sent to the memory read request section 6.

Further, this register control section 53A is connected to the head jetting data transfer section 54 through the nozzle column-direction latching section 53d. The order of arrangement of the nozzles 40 (1) through 40 (q) with respect to the reference edges D1 in the recording head 4A corresponding to each nozzle column-direction latching section 53d is extracted from the command signal. It is once latched by the nozzle column-direction latching section 53d, and is sent to the head jetting data transfer section 54.

Further, the control section 5A has a memory read request section 6A and head jetting data transfer section 54A.

As shown in FIG. 5, the memory read request section 6A includes a "p" delay counters 61A corresponding to recording heads 4A, a row-direction address selection section 62A and a column-direction address selection section 65A.

Of these components, the delay counters 61A counts up and counts down the distance between the edge K1 of the recording medium K detected by the recording medium detection section 31 and the ink hitting position T of the corresponding recording head 4, based on the information (the position information in the direction of conveyance X of the corresponding recording head 4A) from the conveyance direction position setting register 60, and the pulse signal from the encoder 32, whereby the count is outputted. It is also possible to ensure that this delay counter 61A counts up and counts down the distance between the edge on the front end in the direction of conveyance X in the recording area of the recording medium K and the ink hitting position T. In the following description, of these "p" delay counters 61A, the counter corresponding to the recording head 4A (P) is assumed as the delay counter 61A (P), and the numeral in parenthesis indicates the number of this delay counter 61A.

Further, based on each count of the delay counters 61A, the row-direction address selection section 62A sequentially selects the addresses of the one-column image data to be recorded at a predetermined time interval by the recording head 4A corresponding to the delay counter 61A, out of the row-direction addresses "1" through "m" for one page in the page memory 33, wherein this selection starts from the head address. This address and the identification number "P" of the recording heads 4A are sent to the read address generation section 66 and memory read request generation section 63.

If there is no recording medium K at the position opposite to the recording head 4A, namely, if the page memory 33 does not contain the address of the storage element P for storing the one-column image data to be recorded by the recording head 4A at a predetermined time interval, this row-direction address selection section 62A transmits the signal notifying the absence of address and the identification number "P" of this recording head 4A to the read address generation section 66 and memory read request generation section 63.

Based on the information sent from the width-direction position setting register 64, the column-direction address selection section 65A selects the addresses "1" through "q" and "q+1" through "2q" of the one-dot image data to be recorded by each recording head 4A out of the column-direction addresses "1" through "n" in the page memory 33, and transmits this address and identification number "P" of the recording head 4A to the read address generation section 66. In this variation, a plurality of the lines of nozzles L of the recording head 4A are provided from one end to the other end of the recording medium K. Accordingly, in the column-direction address selection section 65, all the addresses in the direction of column of the page memory 33 are divided according to the number of the lines of nozzles L (the number "P" of the recording heads 4A) before selection is made.

Further, in the head jetting data transfer section 54A, the one-column image data which is divided according to the number "P" of the recording heads 4A and is transmitted from the page memory 33—namely, a plurality of pieces of one-dot image data—are serially sent to the shift register 42 of each recording head 4A as the one-bit jetting enable/disable data for each nozzle 40.

To put it in greater details, based on the identification number "P" of the recording head 4A sent from the memory read request section 6A through the page memory 33, the head jetting data transfer section 54A sends the image data to the shift register 42 of the recording head 4A (P) corresponding to the identification number "P". Further, based on the information from each nozzle column-direction latching sections 53d, when the nozzles 40 of the recording head 4A corresponding to the nozzle column-direction latching section 53d are arranged in the order of nozzles 40 (1) through 40 (q), the head jetting data transfer section 54A sends jetting enable/disable data directly in the normal order of the one-dot image data in this one-column image data. If these nozzles 40 are arranged in the order of nozzle 40 (q) through 40 (1), the head jetting data transfer section 54A sends jetting enable/disable data in the order reverse to that of the one-dot image data.

Based on the information from the jetting timing generation section 52, this head jetting data transfer section 54A transmits to the shift register 42 of each recording head 4A the latch timing signal of the jetting enable/disable data and the SCLK signal for synchronizing the output of the jetting enable/disable data with each jetting operation.

[6] Operation If inkjet Recording Apparatus 1A

Referring to FIG. 6, the following describes the operation of the inkjet recording apparatus 1A.

[6-1] When the Conveyance Apparatus 2 Conveys the Recording Medium K in the Normal Conveyance Direction X (+):

In the first place, referring to FIG. 6 (a), the following describes the operation when the recording medium K is conveyed in the normal conveyance direction X (+):

In this case, when image data and command signal have been sent to the inkjet recording apparatus 1 from the personal computer, image data is stored in the page memory 33, similarly to the case of the [4-1].

When the conveyance apparatus 2 of the inkjet recording apparatus 1 has started conveyance of the ground paper D and recording medium K, the encoder 32 rotates in conformity to the movement of the ground paper D (recording medium K). The amount of rotation is outputted in the form of a pulse signal. Further, the recording medium detection section 31 detects the edge K1 on the front end side of the recording medium K in the direction of conveyance X.

The register control section 53A extracts from the command signal the position information of each recording heads 4A in the direction of conveyance X and in the width-wise direction Y, the number information, and the page number information "1" of the recording medium K for recording an image at a predetermined time interval. These pieces of information are once latched by the corresponding head position information latching sections 53 and are then sent to the memory read request section 6. The number information of the recording head 4A to be transmitted in this case includes the notification that the recording heads 4A are numbered "1", "2", . . . "P" counting from the side closest to the operation panel 3a.

This register control section 53A extracts from the command signal the information on the order of arrangement (nozzles 40 (1) through 40 (q) in this operation example) of the nozzles 40 in each recording head 4A with respect to the reference edge D1, and latches it once to the corresponding nozzle column-direction latching sections 53d. This information is then sent to the head jetting data transfer section 54A.

Then, based on the information (position information of each recording head 4A in the width-wise direction Y) sent from the width-direction position setting register 64, the column-direction address selection section 65A selects addresses "1" through "q" and "q+1" through "2q" of the one-dot image data to be recorded by each recording head 4A, out of the column-direction addresses "1" through "n" in the page memory 33. This address and identification number "P" of the recording head 4A are sent to the read address generation section 66.

When the recording medium detection section 31 is used as a reference position, the position information of each recording head 4 in the direction of conveyance X is transmitted to each delay counter 61A through the conveyance direction position setting register 60. Each delay counter 61A starts to count up and down the distance between the edge K1 of the recording medium K and the ink hitting position T of the corresponding recording head 4A, based on the pulse signal from the encoder 32.

In the next step, based on the count from each delay counter 61A, the row-direction address selection section 62A sequentially selects the addresses of the one-column image data to be recorded at a predetermined time interval by the recording head 4A corresponding to this delay counter 61A, out of the row-direction addresses for one page in the page memory 33, wherein this selection starts from the head address. The selected address "r" (wherein "r" is an integer from 0 through m) and the identification number "P" of the recording head 4A are then sent to the read address generation section 66 and the memory read request generation section 63.

In the next step, based on the address "r" selected by the row-direction address selection section 62, the addresses "1" through "q", "q+1" through "2q" selected by the column-direction address selection section 65, and page number information "1" sent from the register control section 53A, the read address generation section 66 sends to the memory controller 51 the addresses (r-1) through (r-q) and (r-(q+1)) through (r-2q) of the image data to be read out of the page memory 33. Further, the memory read request generation section 63 sends a read request signal to the memory controller 51 so as to read the image data of the address sent from the read address generation section 66. This procedure allows the image data to be read from the storage elements P (r-1) through P (r-q) of the page memory 33, and the image data is then sent to the head jetting data transfer section 54A.

In the next step, based on the identification number "P" of the recording head 4A sent from the memory read request section 6 and the information from each nozzle column-direction latching section 53d (the information that nozzles 40 are arranged in the order of nozzles 40 (1) through 40 (q) in the operation example), the head jetting data transfer section 54A serially sends a plurality of pieces of one-dot image data sent from the page memory 33, as one-bit jetting enable/disable data for each nozzle 40 to the shift register 42 of the recording head 4A (P) corresponding to the identification number "P" directly in the normal order. This procedure ensures that the jetting enable/disable data corresponding to the image data of storage elements P (r-1) through P (r-q) and others in the page memory 33 is stored in the storage elements S (1) through S (q) of the shift register 42. Thus, according to the arrangement in the page memory 33, each one-dot image data in the one-column image data of the page memory 33 is stored as the jetting enable/disable data in the entire register 42 in the arrangement of the recording heads 4A (1) through 4A (p), namely, in the arrangement of the recording heads 4A on the side closer to the reference edge D1 of the ground paper D.

In this case, based on the information from the jetting timing generation section 52, the head jetting data transfer section 54A sends to the shift register 42 the latch timing signal (drive waveform signal) for the jetting enable/disable data and the SCLK signal for synchronizing the output of jetting enable/disable data with jetting operation.

When the record area of the recording medium K that corresponds to the first jetting has reached the ink hitting position T, the recording head 4 emits ink in response to the jetting enable/disable data and drive waveform.

After that, the aforementioned operations are repeated. Thus, the image data for the recording medium K of the relevant page is read out from the page memory 33 in the order of the one-column image data being stored and in the order of the one-dot image data being stored, and is stored in each shift register 42 as the jetting enable/disable data in the order of being read out. The image is recorded on each recording medium K (recording medium K at the right side of the figure) based on this jetting enable/disable data.

[6-2] When the Conveyance Apparatus 2 Conveys the Recording Medium K in the Reverse Conveyance Direction X (−):

Referring to FIG. 6(b), the following describes the operation when the conveyance apparatus 2 conveys the recording medium K in the reverse conveyance direction X (−)

In this case, when the image data and command signal have been transmitted from the personal computer to the inkjet recording apparatus 1, the image data is stored in the page memory 33, as in the case of the aforementioned [4-1].

In the next step, when the conveyance apparatus 2 of the inkjet recording apparatus 1 has started the conveyance of the ground paper D and recording medium K, the encoder 32 rotates in conformity to the movement of the ground paper D (recording medium K), and the amount of rotation is outputted as a pulse signal. The recording medium detection section 31 detects the edge K1 on the front end of the recording medium K in the direction of conveyance X.

The register control section 53A extracts the information on the position of the recording head 4 in the direction of conveyance X and in the width-wise direction Y, the number information and the page number information "1" of the recording medium K for recording an image at a predetermined time interval. These pieces of information are once latched by the corresponding head position information latching sections 53c and are then sent to the memory read request section 6. The number information of the recording head 4A to be transmitted in this case includes the information that recording heads 4A are numbered in the order of "1", "2", . . . "P" counting from the side farthest from the operation panel 3a.

Further, the register control section 53A extracts from the command signal the order of arrangement (nozzles 40 (q) through 40 (1) in this operation example) of the nozzles 40 in each recording heads 4A with respect to the reference edge D1, and latches it once to the corresponding nozzle column-direction latching sections 53d. This information is then sent to the head jetting data transfer section 54A.

Then, based on the information (position information of each recording head 4A in the width-wise direction Y) sent from the width-direction position setting register 64, the column-direction address selection section 65A selects addresses "1" through "q" and "q+1" through "2q2" of the one-dot image data to be recorded by each recording head 4A, out of the column-direction addresses "1" through "n" in the page memory 33. This address and identification number "P" of the recording head 4A are sent to the read address generation section 66.

When the recording medium detection section 31 is used as a reference position, the position information of each recording head 4 in the direction of conveyance X is transmitted to each delay counter 61A through the conveyance direction position setting register 60. Each delay counter 61A starts to count up and down the distance between the edge K1 of the recording medium K and the ink hitting position T of the corresponding recording head 4A, based on the pulse signal from the encoder 32.

In the next step, based on the count from each delay counter 61A, the row-direction address selection section 62A sequentially selects the addresses of the one-column image data to be recorded at a predetermined time interval by the recording head 4A corresponding to this delay counter 61A, out of the row-direction addresses for one page in the page memory 33, wherein this selection starts from the head address. The selected address "r" and the identification number "P" of the recording heads 4A are then sent to the read address generation section 66 and the memory read request generation section 63.

In the next step, based on the address "r" selected by the row-direction address selection section 62, the addresses "1" through "q", "q+1" through "2q" selected by the column-direction address selection section 65, and page number information "1" sent from the register control section 53A, the read address generation section 66 sends to the memory controller 51 the addresses (r-1) through (r-q) and (r-(q+1)) through (r-2q) of the image data to be read out of the page memory 33. Further, the memory read request generation section 63 sends a read request signal to the memory controller 51 so as to read the image data of the address sent from the read address generation section 66. This procedure allows the image data to be read from the storage elements P (r-1) through P (r-n) of the page memory 33, and the image data is then sent to the head jetting data transfer section 54A.

In the next step, based on the identification number "P" of the recording head 4A sent from the memory read request section 6 and the information from each nozzle column-direction latching section 53d (the information that nozzles 40 are arranged in the order of nozzles 40 (q) through 40 (1) in the operation example), the head jetting data transfer section 54A serially sends a plurality of pieces of one-dot image data sent from the page memory 33, as one-bit jetting enable/disable data for each nozzle 40 to the shift register 42 of the recording head 4A (P) corresponding to the identification number "P" in the reverse order. This procedure ensures that the jetting enable/disable data corresponding to the image data of storage elements P (r-n) through P (r-1) in the page memory 33 is stored in the storage elements S(1) through S(q) of the shift register 42. Thus, according to the arrangement in the page memory 33, each one-dot image data in the one-column image data of the page memory 33 is stored as the jetting enable/disable data in the entire register 42 in the arrangement of the recording heads 4A (1) through 4A (p), namely, in the arrangement of the recording heads 4A on the side closer to the reference edge D1 of the ground paper D.

In this case, based on the information from the jetting timing generation section 52, the head jetting data transfer section 54A sends to the shift register 42 the latch timing signal (drive waveform signal) for the jetting enable/disable data and the SCLK signal for synchronizing the output of jetting enable/disable data with jetting operation.

When the record area of the recording medium K that corresponds to the first jetting has reached the ink hitting position T, the recording head 4 emits ink in response to the jetting enable/disable data and drive waveform.

After that, the aforementioned operations are repeated. Thus, the image data for the recording medium K of the relevant page is read out from the page memory 33 in the order of the one-column image data being stored and in the order of the one-dot image data being stored, and is stored in each shift register 42 as the jetting enable/disable data in the order of one-column image data being read and in the order reverse to that of the one-dot image data being read. The image is recorded on each recording medium K being fed in the reverse conveyance direction (recording medium K on the left end of the figure) based on this jetting enable/disable data. To put it another way, the image is recorded on each recording medium K based on the image data turned 180 degrees, as a result. Accordingly, the recorded image is the same as that of the aforementioned [6-1].

The inkjet recording apparatus 1A described above provides the same advantages as those of the inkjet recording apparatus 1 of the aforementioned embodiment when an image is recorded by a plurality of recording heads 4A, as well.

In the above description of the embodiment and variations, one-color ink is emitted from one line of nozzles L of the recording head 4. It is also possible to arrange such a configuration that multiple colors of ink are emitted from plurality lines of nozzles L. In this case, image data of each color is stored for each page in the page memory 33. Further, the read address generation section 66 sends the address of the image data of the relevant color in the page memory 33 to the memory controller 51, according to the color information sent from the register control section 53.

What is claimed is:

1. A print unit comprising:
    a recording head which jets ink onto recording media which is sequentially conveyed in one of a normal conveyance direction and a reverse conveyance direction, wherein the recording head comprises a nozzle array in which a plurality of nozzles are disposed intersecting to the conveyance direction and a register which latches jetting data corresponding to each nozzle on each jetting timing of the nozzle array and outputs each jetting data to each nozzle;
    a page memory which memorizes image data to be output to a page of the recording medium in a data order corresponding to the normal conveyance direction, wherein the page memory divides the image data to be output to the page of the recording medium into a plurality of image data of one line to be printed on each jetting timing and stores the plurality of image data of one line in an order of the jetting timing, wherein each of the image data of one line is divided into a plurality of image data of one dot to be printed at each nozzle and is stored in an order of a disposition of the nozzles;
    a conveyance direction detection section for detecting if the conveyance direction is the normal conveyance direction or the reverse conveyance direction; and
    a control section which controls the recording head to jet ink based on the image data to be output to the page of the recording medium at the page memory,
    wherein the control section comprises a reading out section which memorizes the image data to be output to the page of the recording medium at the register as the jetting data in a order of storing the plurality of the image data of one line in the page memory, wherein each of the image data of one line is memorized at the register in a order of storing the plurality of image data of one dot in the page memory, in case when the detection section detects the conveyance direction as the normal conveyance direction;

and memorizes the image data to be output to the page of the recording medium at the register as the jetting data in the order of storing the plurality of the image data of one line in the page memory, wherein each of the image data of one line is memorized in a reverse order to the order of storing the plurality of the image data of one dot in the page memory, in case when the detection section detects the conveyance direction as the reverse conveyance direction.

2. A print unit according to claim 1, wherein the read out section reads out the image data to be output to the page of the recording medium from the page memory in the order of storing the plurality of the image data of one line, reads out each of the image data of one line in the order of storing the plurality of image data of one dot, and memorizes the image data to be output to the page of the recording medium as the jetting data at the register in the order of storing the plurality of the image data of one line, wherein each of the image data of one line is memorized at the register in the order of storing the plurality of image data of one dot, in case when the detection section detects the conveyance direction as the normal conveyance direction; and the read out section reads out the image data to be output to the page of the recording medium from the page memory in the order of storing the plurality of the image data of one line, reads out each of the image data of one line in the order of storing the plurality of the image data of one dot, and memorizes the image data to be output to the page as the jetting data at the register in the order of storing the plurality of the image data of one line, wherein each of the image data of one line is memorized in the reverse order to the order of the storing the plurality of the image data of one dot, in case when the detection section detects the conveyance direction as the reverse conveyance direction.

3. A print unit according to claim 2, wherein the register is a shift register which inputs serially the jetting data corresponding to each nozzle, latches jetting data of each jetting timing, and outputs the jetting data in a parallel form on each jetting timing.

4. A print unit according to claim 2, wherein the register is a shift register which inputs serially the jetting data corresponding to each nozzle from one of one end and an other end thereof, latches jetting data of each jetting timing, and outputs the jetting data in a parallel form, wherein the read out section read outs the image data to be output to the page of the recording medium in the order of storing the plurality of the image of one line from the page memory, reads out each of the image data of one line in the order of storing the plurality of the image of one dot, and inputs serially each of the image data of one line as the jetting data at the register from the one end, in case when the detection section detects the conveyance direction as the normal conveyance direction; and the read out section read outs the image data to be output to the page of the recording medium in the order of storing the plurality of the image of one line from the page memory and reads out each of the image data of one line in the order of storing the plurality of the image of one dot, and inputs serially each of the image data of one line as the jetting data at the register from the other end, in case when the detection section detects the conveyance direction as the reverse conveyance direction.

5. A print unit according to claim 1, wherein the read out section reads out the image data to be output to the page of the recording medium from the page memory in the order of storing the plurality of the image data of one line, reads out each of the image data of one line in the order of storing the plurality of the image data of one dot, and memorizes the image data to be output to the page of the recording medium as the jetting data at the register in an order of reading out the plurality of the image data of one line from the page memory, wherein each of the image data of one line is memorized at the register in an order of reading out the plurality of image data of one dot from the page memory, in case when the detection section detects the conveyance direction as the normal conveyance direction; and the read out section reads out the image data to be output to the page of the recording medium from the page memory in the order of storing the plurality of the image data of one line, reads out each of the image data of one line in a reverse order to the order of storing the plurality of the image data of one dot, and memorizes the image data to be output to the page of the recording medium as the jetting data at the register in an order of reading out the plurality of the image data of one line, wherein each of the image data of one line is memorized at the register in an order of reading out the plurality of image data of one dot, in case when the detection section detects the conveyance direction as the normal conveyance direction.

6. A print unit according to claim 1, wherein the print unit comprises a plurality of recording heads disposed in the direction intersecting to the conveyance direction so that a width of jetting area thereof covers a width of the recording medium, wherein the read out section puts an order to registers of the plurality of the recording heads in one of left to right direction and reverse direction; changes the order of the registers depending on the conveyance direction; and memorizes the plurality of the image data of one dot for each of the image data of one line as the jetting data at the registers in an order of a disposition of the image data in the page memory.

7. An ink jet recording apparatus comprising the print unit according to claim 1 and a convey unit which conveys the recording media in one of the normal conveyance direction and the reverse conveyance direction.

* * * * *